United States Patent [19]

Correy

[11] Patent Number: 4,829,153
[45] Date of Patent: May 9, 1989

[54] WELDING ARC INITIATOR

[75] Inventor: Thomas B. Correy, Richland, Wash.

[73] Assignee: Battelle Memorial Institute, Columbus, Ohio

[21] Appl. No.: 68,698

[22] Filed: Jun. 30, 1987

Related U.S. Application Data

[63] Continuation-in-part of Ser. No. 856,746, Apr. 28, 1986, abandoned.

[51] Int. Cl.$^4$ ............................................... B23K 9/06
[52] U.S. Cl. .................................. 219/130.4; 219/136; 219/121.6
[58] Field of Search .............. 219/130.4, 136, 137 PS, 219/121 U, 124.34

[56] References Cited

U.S. PATENT DOCUMENTS 4,578,561  3/1986  Corby, Jr. et al. ............. 219/124.34

FOREIGN PATENT DOCUMENTS

| 2709007 | 9/1978 | Fed. Rep. of Germany ... 219/130.4 |
| 47-13123 | 4/1972 | Japan ............................. 219/121 U |
| 187894 | 5/1965 | U.S.S.R. ........................ 219/121 U |
| 02095489 | 9/1982 | United Kingdom ............. 219/130.4 |

Primary Examiner—Clifford C. Shaw
Attorney, Agent, or Firm—Klaus H. Wiesmann; Benjamin Mieliulis

[57] ABSTRACT

An improved inert gas shielded tungsten arc welder is disclosed of the type wherein a tungsten electrode is shielded within a flowing inert gas, and, an arc, following ignition, burns between the energized tungsten electrode and a workpiece. The improvement comprises in combination with the tungsten electrode, a starting laser focused upon the tungsten electrode which to ignite the electrode heats a spot on the energized electrode sufficient for formation of a thermionic arc. Interference problems associated with high frequency starters are thus overcome.

2 Claims, 3 Drawing Sheets

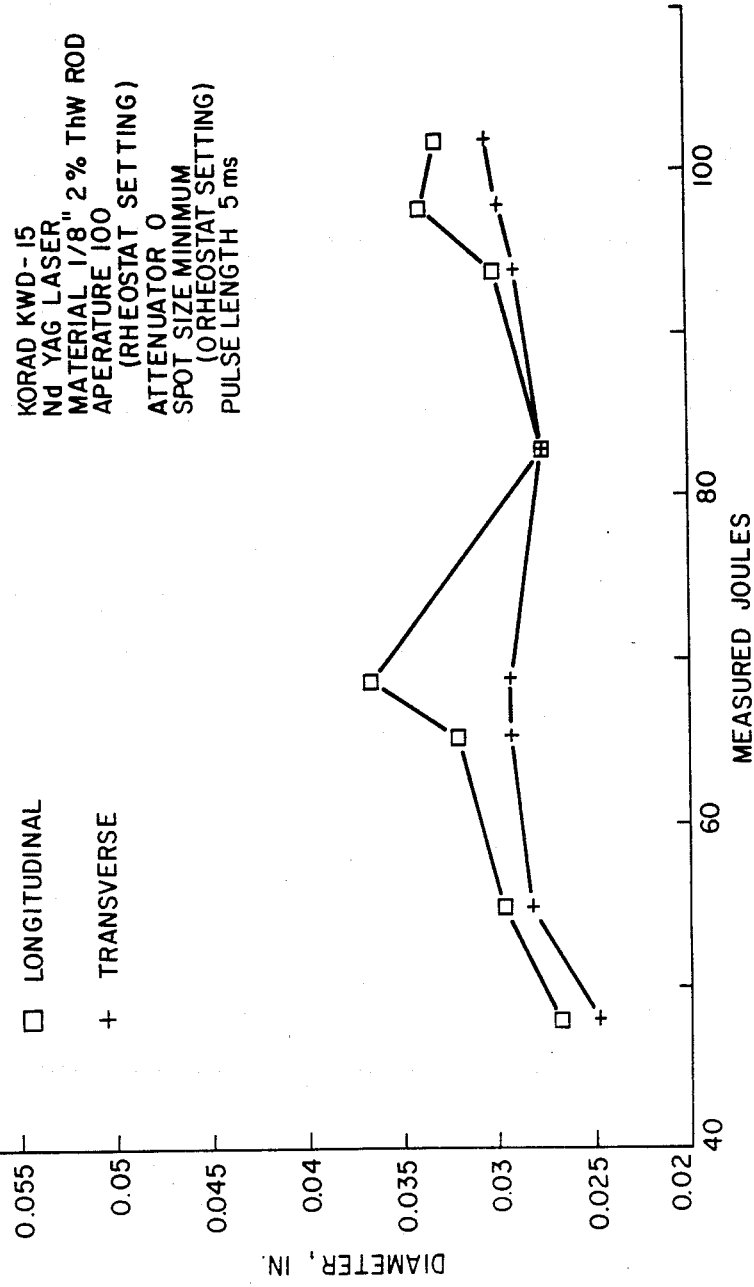

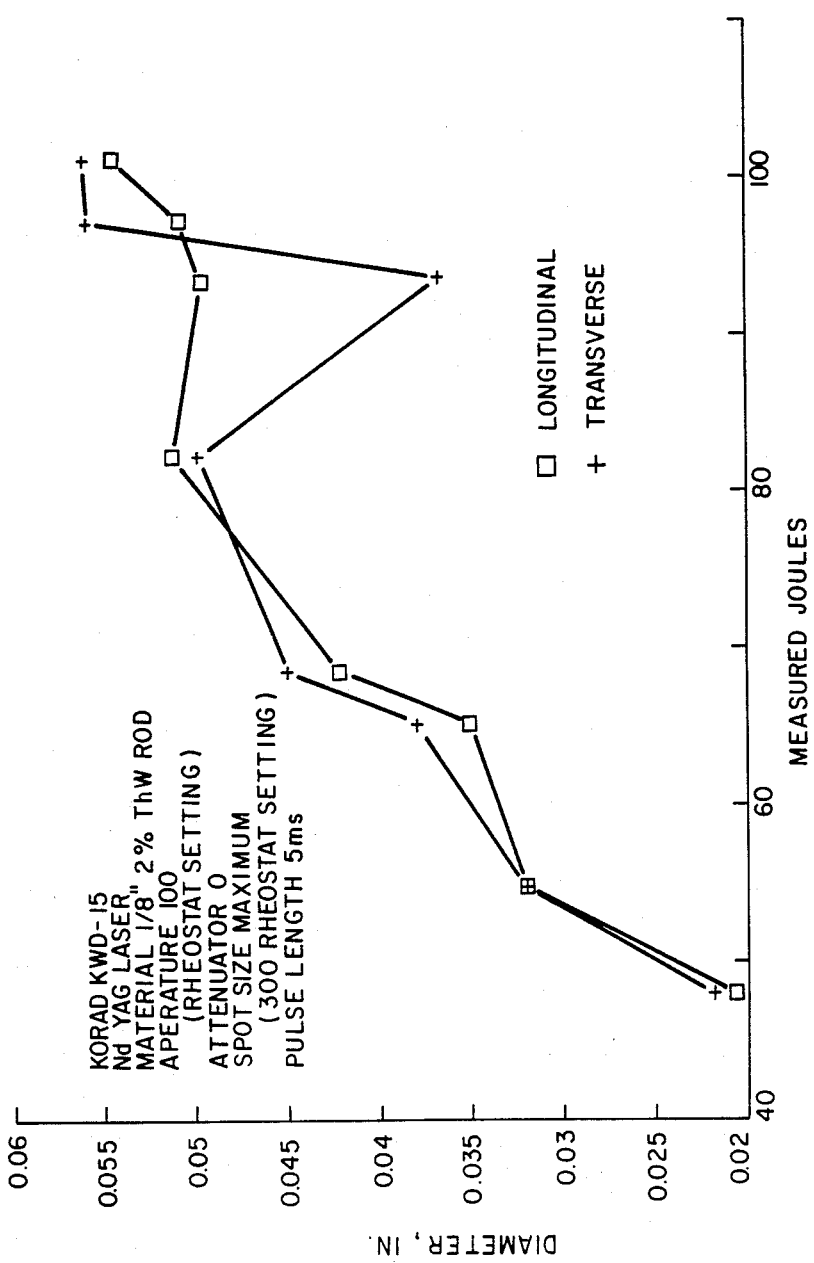

WELDING ARC INITIATOR

STATEMENT OF GOVERNMENTAL RIGHTS

The U.S. government has a paid up license in this invention and the right in limited circumstances to require the patent owner to license others on reasonable terms as provided for by the terms of Contract No. DE-AC-06-76RLO 1830 awarded by the U.S. Department of Energy.

The present application is a continuation in part of U.S. patent application Ser. No. 856,746 filed Apr. 28, 1986, now abandoned.

FIELD OF THE INVENTION

This invention relates to arc welding, more specifically to inert gas shielded tungsten arc welding and means for starting arcs in such devices.

DESCRIPTION OF RELATED ART

Tungsten inert gas arc welding is also known as Heliarc ® welding. Metal fusion is created by the heat of the arc formed between a nonconsumable electrode and the workpiece being welded.

A shielding blanket of inert gas such as argon or helium protects the metal surface from oxidation or contamination due to contact with atmospheric oxygen or other reactive gases.

The inert gas shielded power source can be DC or AC. Reverse polarity DC is less commonly used due to arc instability and low power density, however, it has the advantage of oxide cleaning action when welding oxidizable metals such as aluminum or magnesium. AC is more common being a combination of straight and reverse polarity direct current. AC has a half-cycle oxide cleaning action when the tungsten electrode is of positive polarity.

AC welding power sources typically do not produce a voltage that is high enough to reestablish the arc in an inert atmosphere when the voltage goes through the nodal point of the AC cycle unless the current and voltage are true or nearly true square waves. In order to start the arc, produce a stable arc, and eliminate the troublesome zero point of the AC cycle, a high frequency current is often superimposed across the arc.

"Tungsten electrode" is to be understood herein and throughout this application as also referring to alloyed electrodes such as zirconated or thoriated tungsten electrodes among others.

In gas direct-current tungsten arc welding, the tungsten electrode is typically thoriated or alloyed with $ThO_2$ typically at 1 or 2% for improved D.C. arc striking characteristics. Tungsten electrodes are often zirconated for less contamination when working with aluminum with AC.

For ignition, a high frequency, high voltage spark gap oscillator is often used to enable the arc to be ignited without touching down the electrode on the work. This helps prevent electrode contamination.

The oscillator typically consists of an iron core transformer with high voltage secondary winding, a capacitor, a spark gap and an air core transformer, one coil of which is in the high voltage circuit and the other in the welding circuit. The capacitor is charged every half cycle to 3000–5000 V and discharges across the spark gap. The discharge is oscillatory. In most models discharged randomly, the spark discharged is phased to occur at the beginning of each 8.33 millisecond half cycle. To initiate the arc, the electrode is brought to within approximately 6 mm of the work with the high frequency unit and welding voltage switched on. Groups of sparks pass across the gap ionizing it and the welding current follows in the form of an arc without contamination of the electrode by touching the weldment. Unfortunately, considerable radio and TV interference results including potentially damaging current induction in associated delicate circuits and chips.

Gas tungsten arc welding systems could become more sophisticated if additional data monitoring, recording, and analyzing systems and instruments could be added to the basic welding system. A long standing problem preventing the enhancement of basic welding systems, particularly gas tungsten arc welding systems is that the use of a high frequency current source or a capacitor discharge source for initiating the gas tungsten arc radiates energy that is potentially destructive of sensitive circuits and can cause losses of electronically recorded test data often destroying long period test specimens.

In order for welding oriented computer applications to increase, it is becoming increasingly necessary to develop methods for making the welding equipment compatible with the computer and computer controlled equipment. Such an environment presents high voltage transients from which computers must be protected.

The operation of gas tungsten arc welding and arc starting systems requiring continuous high frequency for arc stabilization produce interference in communications involving telephone, radio, computer and television. Interference problems during arc starting affect computers and other related electrical systems. These interference problems occur with both mechanized and manual gas tungsten arc welding systems.

Electrolytic capacitors in series with the welding circuit have been able to reduce needs for high frequency currents for starting only, however have not been able to eliminate the need unless open circuit voltages in excess of 80 volts or square wave voltages are used.

It is an object of the present invention to disclose an apparatus overcoming the interference problems with delicate circuits, primarily computer, that result from the high frequency current used to initiate and/or stabilize gas tungsten arc welding.

It is an object of the present invention to disclose an alternative in place of high frequency ignition systems for inert gas tungsten arc welding.

BRIEF DESCRIPTION OF THE DRAWING

FIGS. 2 and 3 present a graph of the melted spot diameter for two different laser beam sizes plotted against the computed energy in Joules transferred to the tungsten electrode.

DESCRIPTION OF THE INVENTION

Figure 1:
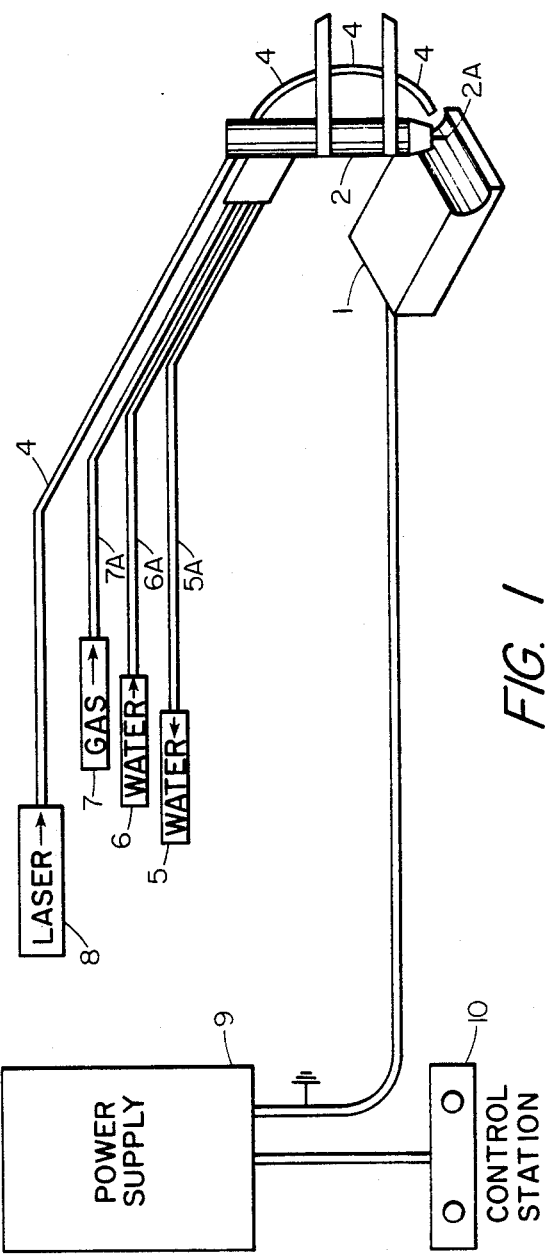
FIG. 1 depicts a laser-started inert gas tungsten welder according to the invention.

The present invention discloses an improved inert gas shielded tungsten arc welder which has an arc starter that does not produce interference with associated delicate electronics such as chips and microprocessors. The present invention is an improvement over gas tungsten arc welders using a high frequency current source or a capacitor discharge source for initiating the welding arc.

The present invention comprises a gas tungsten arc welder having a low output laser to ignite the arc. Arcing is initiated by heating the negative polarity tungsten electrode to produce a hot spot which supplies enough electrons to permit the formation of a thermionic arc across the gap between the electrode and workpiece.

The laser is focused upon the electrode, advantageously near the tip. The laser is turned on when the electrode is energized so as to aid the formation of the thermionic arc without need for touching the workpiece surface with the electrode. Measured per second, the laser should have an output of 50-60 watts, though larger output lasers can be used with shorter "on" times. The more important aspect is that the spot on the electrode struck by the laser is heated to approximately 1000° K. Appropriate lasers to accomplish this requirement can readily be selected by those skilled in the art. This hot spot sufficiently ionizes the immediate air gap and supplies sufficient electrons from the surface at the finite open circuit voltage enabling the formation of a thermionic arc.

The arc usually starts at the shank of the negative electrode and immediately transfers to the tip. The arc positions itself in a manner producing the minimum arc voltage.

Looking now at FIG. 1, gas shielded electrode 2 is positioned near workpiece 1. An inert shielding gas such as argon is fed from source or cylinder 7 via gas transport tube 7A. The gas is routed axially around and uniformly around the electrode tip 2A. Water cooling is optionally provided from water source 6 through inlet tubing 6A and return tubing 5A to water return reservoir 5. The water return reservoir, if large enough to dissipate acquired heat during operation, can also function as the water source.

The electrode control station 10 with on-off buttons illustrated is connected to welding power supply 9 and energizes electrode 2 when the on switch is engaged at control station 10. Laser 8 is simultaneously turned on. The laser beam is guided by optical fiber 4 to a point near electrode tip 2A. The optical fiber is held in place by two retaining clips. The laser beam heats a spot on the electrode causing thermionic arcing to be initiated. The laser can be timed to turn off after a few fractions of a second of on time. Alternatively, circuitry can be provided to turn off the laser following starting the arc in response to the voltage drop across the gap between the electrode. Such voltage responsive circuitry for example is illustrated in U.S. Pat. No. 4,559,206 to Treharne. Other voltage response circuit variations are known to those skilled in the art.

EXAMPLE

A 650 watt source continuous laser was directed at a tungsten electrode of an inert gas tungsten welder. The laser was operated for 0.25 to 0.50 seconds and instantly initiated an arc. The 650 watt emitted pulse of 0.25 to 0.50 seconds conveyed a laser energy of from 187 to 325 Joules to the electrode.

A minimum laser pulse or heating time (i.e. on time) of 0.1 seconds appears needed to initiate arcing with a laser initiator. This threshold time is also associated with the time for cumulative ionization, and related to the time constants for electrical circuits. Laser bursts can reduce the on time but our experiments have shown 0.005 seconds to be too short a time to heat the electrode surface. The burst of ionization, though it was of sufficient magnitude, was too short of duration.

To ascertain the functional range of initiating an arc with a laser, the laser spot size was varied and the conditions of fusing were measured (See FIGS. 1, 2 and 3). The two sets of measurements, longtitudinal and transverse, in FIGS. 2 and 3 for each spot result from the phenomenon that a circular spot projected onto a cylinder (the welding rod) results in an elliptical spot on the cylinder.

Referring to FIG. 2, it is noted that melting of the laser rod just begins at the lowest energy level plotted. Melting of material at the spot occurs for all the other energy levels plotted; however, above about 80 Joules drilling occurred. Drilling means the formation of a hole with loss of material by vaporization due to the high energy levels and small laser beam setting. FIG. 3 shows the energy levels for a larger laser beam setting. Melting again began at the lowest row in level. Higher energy levels for the larger laser beam setting resulted in larger melted spot sizes but no drilling occurred. The spot sizes plotted in each figure represent the melted spot sizes not the laser beam size. Preferably the apparatus of the invention is operated in a mode where the surface temperature of the spot produced is at least 1000°. The upper operational limit is preferably that below that at which drilling occurs.

By using empirical data together with heat transfer solutions, the table was prepared relating laser pulse magnitudes and pulse length to achieve different temperatures over different areas.

Thus, by doing "just" melting experiments, it was possible to relate energy from the laser to that absorbed in the tungsten.

To scale to temperature of interest, equation 7.1.5 and FIG. 7.7 from UCRL-5263, "Conduction Heat Transfer Solutions" by Jams H. Van Sant, published by Lawrence Livermore Laboratory, were used. This equations, which is well known to those skilled in the art, can be used to calculate the conduction through a solid.

For surface temperatures at x=0, the equations reduce to the equation of interest:

$$\frac{(t - t_i)K}{q_o \sqrt{\alpha T}} = \frac{2}{\sqrt{\pi}}$$

At initial conditions: t=ti, X≧O, T=0, $q_x=q_o$, X=O, T>O
x=o location of heat input
t=body temperature
ti=initial body temperature (before heat input)
K=body thermal conductivity
α=thermal diffusivity
T=time, at time zero the entire body is at ti (initial temperature)

From this it was concluded that the temperature reached is proportional to the square root of the pulse length (time) and the temperature needed is directly proportional to the pulse magnitude (height). It is possible to extrapolate back to when melting just started. This is at about 45 Joules.

It is seen from FIG. 2 that melting just started at a computed 47.5 Joules with a fused diameter of 0.026 inches. The Joules were computed from the electrical condenser storage capacity and the voltage applied to it. While this is not the actual laser energy emitted from the laser it provides a useful estimate even though the energy from the laser is not all absorbed in the tungsten and under certain conditions 20 to 70 percent may be reflected or reradiated depending on specific pulse height, spectral conditions, and surface temperature. The "just melted" spot diameter from FIG. 3 is 0.021 inches at 47.5 Joules. The laser beam spot size was set for maximum for FIG. 3 and minimum for FIG. 2. Thus, a "just melted" point to use for an initiation appears to be with a laser melted spot of 0.020 inches diameter or 0.5 mm. The area is 0.197 mm² for which the energy stored for the laser charging was computed to be 47.5 Joules. This works out to be 241 Joules for laser charging per square mm of "just melted" surface.

By using this empirical data together with the heat transfer equation above it was possible to relate energy from the laser to that absorbed in the tungsten.

To estimate laser charging magnitude and pulse lengths to achieve surface temperatures of interest, the pulse necessary to achieve a given temperature rise is inversely proportional to the square root of the pulse duration (length) and temperature achieved for a given pulse duration is proportional to the energy of the pulse. The pulses are assumed to be square waves.

TABLE

Computed Charging Energy (Joules) to Laser per mm² Heated Thoriated Tungsten Area for Various Pulse Lengths in Milliseconds

| Maximum Surface Temp °C. | Pulse Length Milliseconds | | | |
|---|---|---|---|---|
| | 5 | 20 | 80 | 320 |
| 3410 | 241 | 120 | 60 | 15 |
| 2500 | 171 | 85 | 42.5 | 10.6 |
| 2000 | 132 | 66 | 33 | 8.3 |
| 1500 | 94 | 47 | 33.5 | 5.8 |
| 1000 | 55 | 22.5 | 11.25 | 2.4 |

The above table lists the charging energy in Joules per area in square millimeters to be covered by the spot of laser light. The temperature of the rod (maximum surface temperature) that can be reached at the spot is shown for various combinations of laser input energy and pulse duration (length).

Achieving a surface temperature of at least 1000° K. appeared to be minimal for arc initiation.

A further general description of the apparatus of the invention includes the combination of the described arc welding system having an electrode tip, with laser means for heating the electrode tip that is sufficient for formation of a thermionic arc; laser guiding means or directing the laser beam to the tungsten electrode tip; and control means for controlling the initiation, energy level, and duration of the laser beam.

A general method for initiating a welding arc according to the invention includes the provision of, an arc welding system and energizing a tungsten electrode therein; heating the energized electrode tip with a laser beam having a magnitude and duration sufficient to heat a spot on the electrode tip above 1000° K. but below that temperature where drilling occurs and initiating an arc from the electrode tip to the workpiece.

The apparatus of the invention provides several advantages not available in the prior art. For example, the use of the fiber optic cable allows easy, accurate and precise positioning of the laser beam. The positioning of the laser beam on the electrode tip allows for easily reproduceable formation of ions in the vicinity of the tip. The characteristics of the tip are known and the laser beam can easily be adjusted for different tip characteristics. Further, positioning of the beam on the electrode rather than the workpiece as in other prior art devices provides protection of the workpiece from the effects of the laser beam. Workpiece characteristics vary and are not necessarily conducive to ion formation. Further, increased portability and ease of use of the apparatus of the invention is achieved by the combination of the laser with a fiber optic cable to deliver the beam.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive variations and changes can be made by those skilled in the art without departing from the spirit and scope of the invention.

I claim:

1. In a tungsten electrode inert gas shielded arc welding system of the class wherein a tungsten electrode tip is shielded within a flowing inert gas and an arc following ignition burns between the tungsten electrode when energized and a workpiece, a welding arc initiator comprising the combination of:
   a. an electrode of the arc welding system having an electrode tip;
   b. pulsed laser means such as to be able to heat the electrode spot struck by the laser beam to 1000 K in a pulse time of 0.005 seconds or greater for heating the electrode tip sufficient for formation of a thermionic arc;
   c. laser beam guiding means comprising a fiber optic cable for directing the laser beam to the tungsten electrode tip; and
   d. control means for controlling the initiation, energy level, and duration of the laser beam; the laser means, laser beam guiding means, and control means being such as to transfer at least 45 Joules of energy to the electrode.

2. The combination according to claim 1 wherein the laser means has an output of at least 50 watts.

* * * * *